United States Patent [19]

Harrold

[11] Patent Number: 5,203,850
[45] Date of Patent: Apr. 20, 1993

[54] AIR ISOLATED FIFTH WHEEL SYSTEM

[75] Inventor: David O. Harrold, Fort Wayne, Ind.

[73] Assignee: Navistar International Transportation Corp., Chicago, Ill.

[21] Appl. No.: 713,175

[22] Filed: Jun. 10, 1991

[51] Int. Cl.⁵ .................... B62D 53/06; F16F 9/04
[52] U.S. Cl. ........................ 280/438.1; 280/433; 267/122; 267/64.27
[58] Field of Search ............. 280/433, 438.1, 439, 280/440, 441; 92/98 R; 267/64.11, 64.27, 122, 113

[56] References Cited

U.S. PATENT DOCUMENTS

| | | | |
|---|---|---|---|
| 2,741,205 | 4/1956 | Paulton | 92/98 R |
| 2,821,409 | 1/1958 | Chalmers | 280/440 |
| 3,298,285 | 1/1967 | Webb | 92/98 R |
| 4,580,806 | 4/1986 | Kolstad et al. | 280/441 X |
| 4,861,060 | 8/1989 | Schult et al. | 280/439 |
| 4,961,564 | 10/1990 | Schult et al. | 267/64.22 |

FOREIGN PATENT DOCUMENTS 1173087  8/1985  U.S.S.R. ................... 267/64.27
1041072  9/1966  United Kingdom .......... 280/440

OTHER PUBLICATIONS

"Save Nine Ways with Classic Ride" Tartan Transportation Systems, Inc., 1987.
"Fontaine Fifth Wheels" Fontaine Fifth Wheel, 1987.

Primary Examiner—Margaret A. Focarino
Assistant Examiner—Florian Zeender
Attorney, Agent, or Firm—Dennis K. Sullivan

[57] ABSTRACT

An air-isolated fifth wheel system for use in connecting a trailer to a semi-tractor in a manner to isolate vibrational input of the trailer to the fifth wheel from being transferred to the semi-tractor. An inflatable air bag is operably disposed in a centered location beneath the fifth wheel support plate to eliminate vertical fifth wheel load from being transferred to the semi-tractor. The system is light weight and can easily be included into existing fifth wheel assemblies without significant alteration to the chassis of the semi-tractor.

18 Claims, 4 Drawing Sheets

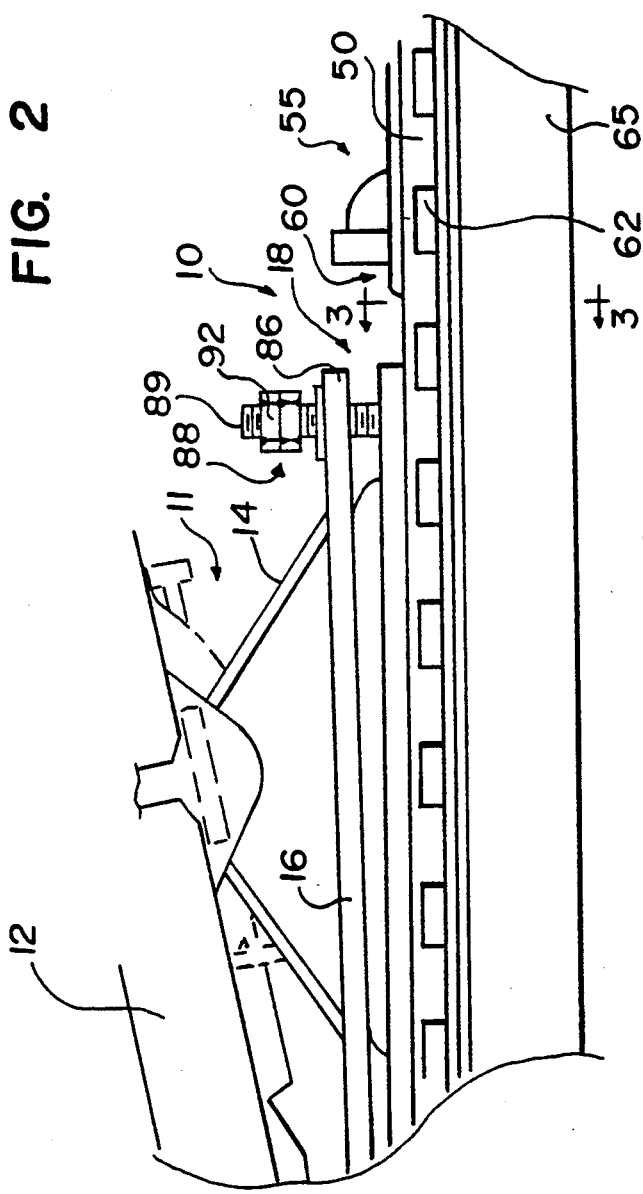
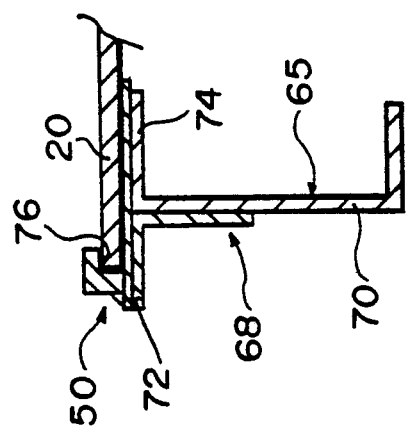
FIG. 2
FIG. 3

AIR ISOLATED FIFTH WHEEL SYSTEM

BACKGROUND OF THE INVENTION

The present invention relates to an isolation system for isolating trailer vibration inputs from passing through the fifth wheel engagement of the trailer to the tractor and thus producing a poor ride for the driver. More particularly, the isolation system is an air isolation system which is mountable to existing non-isolated fifth wheel assemblies.

THE PRIOR ART

Air suspended fifth wheel connections between a tractor and a semi-trailer are disclosed in U.S. Pat. Nos. 4,580,806, 4,861,060, and 4,961,564.

There presently exists commercially at least one air isolated fifth wheel assembly of the type described in the above-mentioned patents. The assembly is of bulky and heavy construction and requires modification of a vehicle chassis for the addition thereof because the isolating structure intrudes below the top of the frame rails of the vehicle. Such chassis modification may entail relocation of existing hardware, or modification of cross members, such as cutting same to provide clearance; these modifications taking up time and labor.

As will be described in greater detail hereinafter, the air isolation system of the present invention can be added on to existing fifth wheel assemblies without any significant modification to the tractor chassis and is relatively light weight.

SUMMARY OF THE INVENTION

According to the invention there is provided an air isolated fifth wheel system. The system includes a base plate which is slidably received within side channel members mounted to a vehicle frame and includes structure for releasably fixing same to the side channel members at various positions therealong. A secondary plate is secured to said base plate and forms a pocket therein within which is secured an air inflatable structure sized and configured to extend across and seat within the pocket. A top plate is hingedly fixed to the base plate at one end thereof, a lower surface of the top plate seating across said inflatable structure. A fifth wheel assembly is pivotably mounted on the top plate and rides upon the inflatable structure, isolating trailer vibration from being passed through the fifth wheel to the semitractor chassis.

BRIEF DESCRIPTION OF THE DRAWINGS

Other objects and advantages of the invention will become more apparent upon perusal of the detailed description thereof and upon inspection of the drawings in which:

FIG. 2 is a side view of the system of FIG. 1 with the side rail thereof shown.

FIG. 3 is a cross sectional view of the area of engagement of the system to frame rails of the semi tractor and is taken along line 3-3 of FIG. 2.

DESCRIPTION OF THE PREFERRED EMBODIMENT

Figure 1:
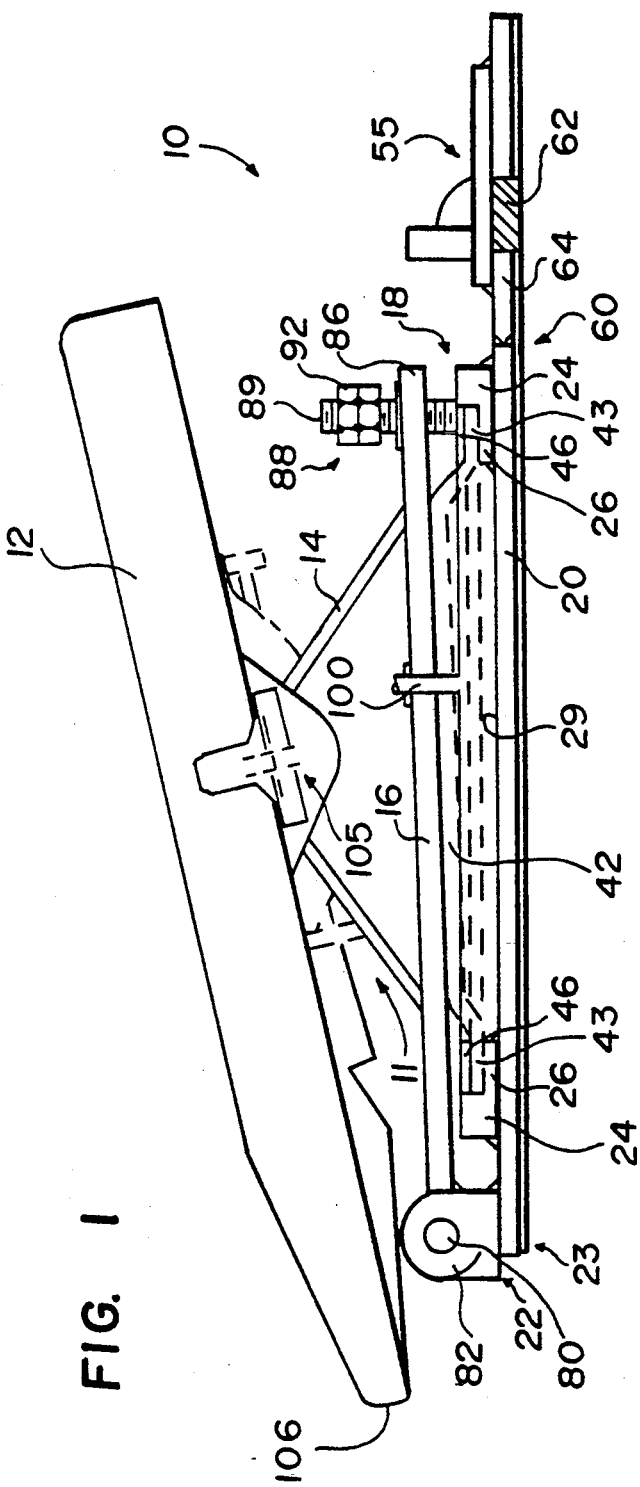
FIG. 1 is a side view of the air isolated fifth wheel system of the present invention with a side rail system thereof removed.
Figure 4:
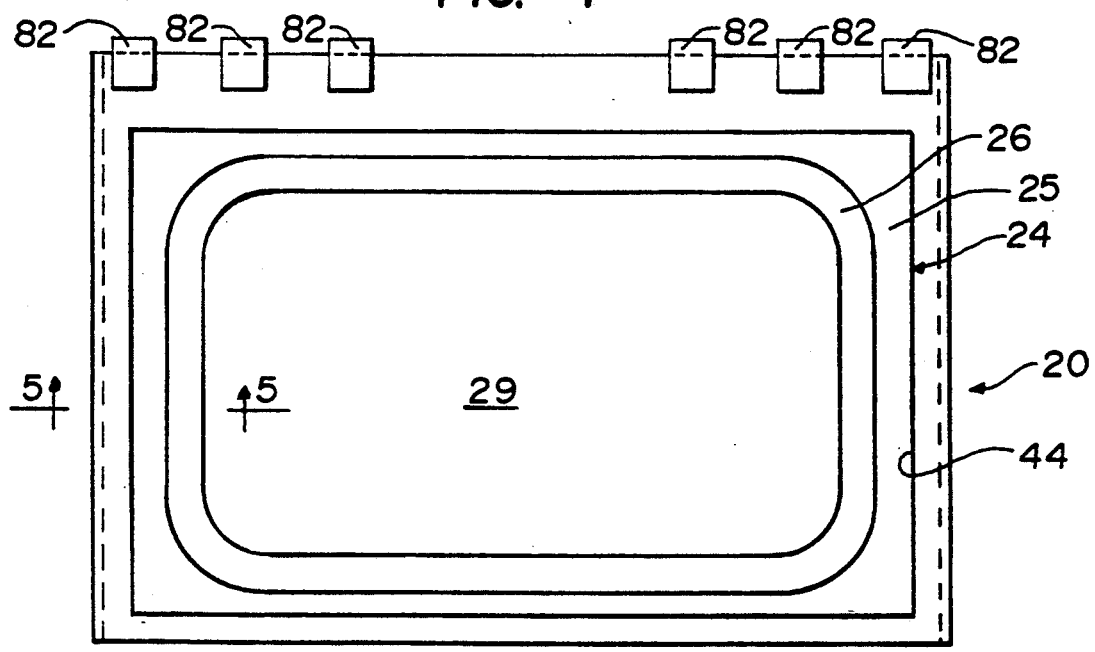
FIG. 4 is a top plan view of a base plate of the assembly and a secondary pocket forming plate welded thereto.
Figure 5:
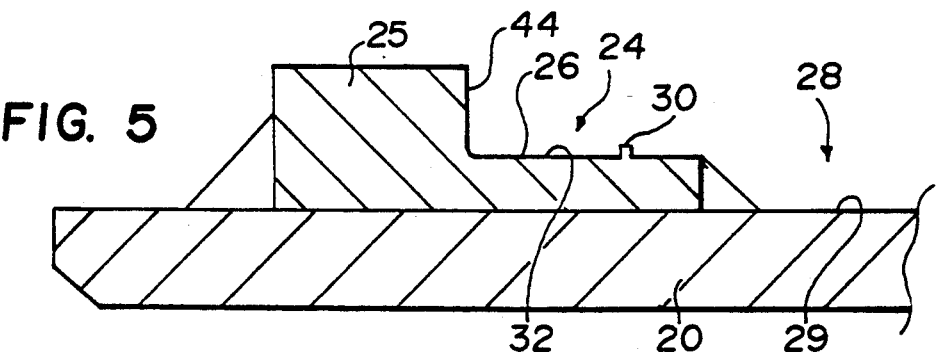
FIG. 5 is a cross sectional view through the base plate and secondary plate of the system and is taken along line 5-5 of FIG. 4.

Referring now to the drawings in greater detail, there is illustrated in the Figures the novel air isolated fifth wheel system of the present invention generally identified by reference numeral 10.

As shown, a conventional fifth wheel 11 comprising a fifth wheel plate 12 mounted by trunions 14 is secured to a support plate 16 for same, the support plate 16 forming a top plate 16 of an air isolation system 18 for the fifth wheel 11.

It will be understood that the fifth wheel plate 12 is pivotable, as required.

The top plate 16 is hingedly fixed to a base plate 20 of the system 10 with the hinge 22 being seated at a rear end 23 of the system 10.

Supported upon base plate 20 is a recessed secondary pocket forming plate 24 which is downwardly stepped radially inwardly of a peripheral edge portion 25 thereof to form a circumferential flange 26 which surrounds a further downwardly stepped area 28 defining pocket 28 therein, the base surface of which is defined by a top surface 29 of base plate 20 of the system 10.

Further, the circumferential flange 26 of the secondary plate 24 includes an upstanding rib 30 which is continuous along top surface 32 of flange 26.

Seated upon the flange 26 and extending across the pocket 28 is a fabric-reinforced rubber diaphragm element 42 sized and configured to be snugly received against upstanding wall 44 defining the radial outward extent of the flange 26. To secure diaphragm element 42 within the confines of upstanding wall 44 and to the flange 26 therebeneath, a clamping ring 46 (FIG. 1) is provided which seats over a peripheral edge 43 of the rubber diaphragm element 42 and is secured to the flange 26 therebeneath in known manner, such as by screws which are received through openings drilled in the clamp ring 46, which further extend through the material of the diaphragm element 42 and engage the flange 26 at a position radially outwardly of the rib 30 thereof.

In this manner, with the diaphragm element 42 and clamp ring 46 in place over the secondary plate 24, an airtight space or pocket 28 is defined beneath the diaphragm element 42 in the area where the base plate 20 is exposed beneath same, within the confines defined by the secondary plate 24. It is this space 28 which creates the air cushion or pillow 28 upon which the fifth wheel 11 will ride, with the air cushion 28 serving to isolate fifth wheel vibrations and keep them from being transferred to the semitractor to which the system 10 is engaged.

One of the unique features of the system 10 is that it is readily accepted by a plurality of conventional fifth wheel assemblies without requiring significant modifications to the existing assembly or vehicle structures.

In this respect, it will be seen from the FIG. 2 that the base plate 20 of the system 10 is sized and configured to seat and glide within side rails 50 of conventional sliding fifth wheel assemblies as well as being easily adapted to fixed fifth wheel assemblies.

Attachment means 55 which are presently available, are added to the base plate 20 by welding same to a forward end 60 of the base plate 20. In this respect air controlled slides 62 are available which can be extended and retracted as desired to allow for movement of the fifth wheel 11, within limits, to allow for better load spread over the axles of the vehicle and to further allow for locking of the system 10 at a desired location.

It will be seen that the base plate 20 of the system 10 is configured to have a thickness equal to that of a base plate 64 of the attachment means 55 and, by simply joining the two, such as by welding, the system 10 is easily accommodated in existing fifth wheel side rail assemblies in a manner that does not detract from the functionality thereof.

Inasmuch as the system 10 does not include structures which extend below the base plate 20, attachment of the system 10 to frame rails 65 of the semi-tractor is very simple, as shown in FIG. 3, the attachment being made in like manner to the method of attaching a fifth wheel of conventional design.

In this respect, an L shaped angle adapter or bracket 68 is attached to a vertical wall 70 of the frame rail 65 of the semitractor in a manner to have one leg 72 thereof extend horizontally and form a continuation of an upper flange 74 of the frame rail 65, essentially doubling the lateral extent of the existing horizontal surface of the frame rail 65. The side rails 50 are then engaged in known manner to this doubled extent horizontal surface of each frame rail 65 and the bottom or base plate 20 of the system 10 is slidably engaged within a cooperating track 76 of each side rail 50 in known manner.

The top plate 16 and fifth wheel 11 attached thereto are then engaged to the base plate 20 by means of pivot pins 80 which extend through wide coacting pivot sections 82 intermittently spaced on the base plate 20 and top plate 16 to form the hinges 22 in a manner allowing the top plate 20 to pivot about the pivot pins 80.

In the embodiment disclosed, three pivot sections 82 are provided toward each side end of the rear end 23 of the base plate 20 in spaced apart manner and two pivot sections 82 are provided in a corresponding area of the top plate 16, also in spaced apart manner and are positioned so that, when the pivot sections 82 are brought into proximity, the two pivot sections 82 of the top plate 16 are received in the spaces between the pivot sections 82 of the base plate 20, forming the hinges 22 about which the upper plate 16 may pivot.

With this engagement of the top plate 16 to the base plate 20, it will be apparent that an opposite free edge 86 of the top plate 16 will be capable of unrestricted rotation about the hinges 22.

To limit the range of motion of the edge 86 of the top plate 16, stop members 88 are provided which allow only a certain range of motion, preferably in the area of about 1 inch of vertical travel from a point of abutment with the peripheral edge portion 25 of the secondary plate 24.

In the chosen embodiment, these stop members 88 are shown in the form of threaded studs 89 extending upwardly from a point of engagement in base plate 20.

Figure 6:
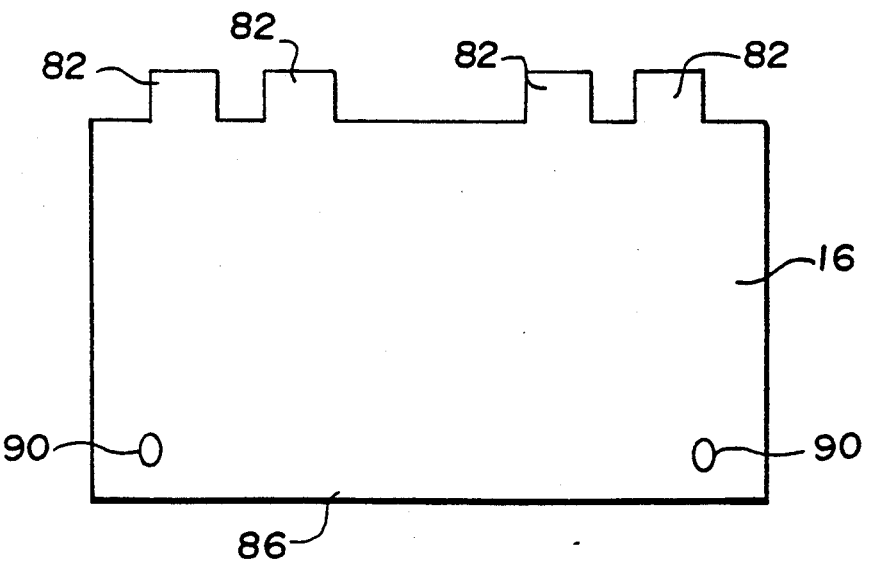
FIG. 6 is a top plan view of an upper plate of the system.
Figure 7:
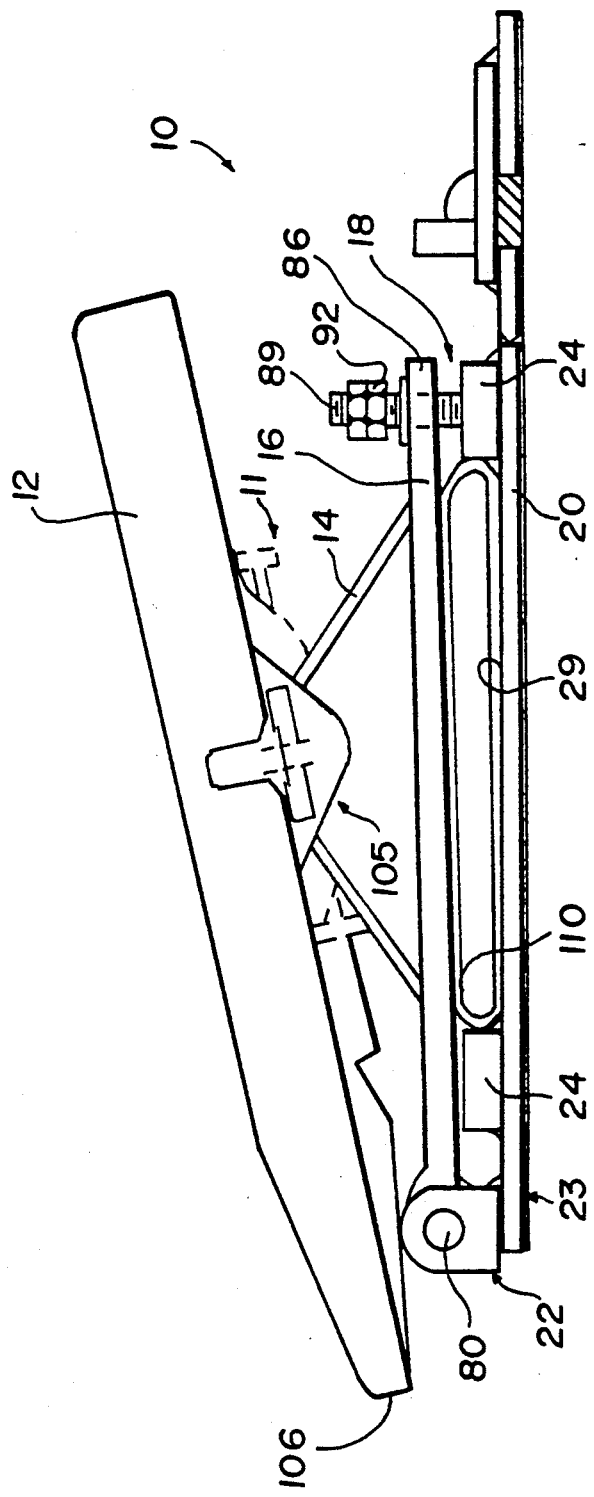
FIG. 7 is a side view of a second embodiment of the system.

It will be understood that the top plate 24 will have two slotted bores 90 (FIG. 6) machined therein positioned to correspond to the positions of the studs 89 and the studs 89 will extend upwardly through these bores 90 when the top plate 16 is appropriately engaged thereover.

Once the top plate 16 has been engaged, nuts 92 are placed on the free end of each stud 89 and positioned to allow for approximately one inch of travel for the top plate 16 along the studs 89.

In order for the system 10 to function appropriately, the pillow or chamber 28 must be inflated to a degree sufficient to absorb the vibrational input from the fifth wheel 11 mounted thereabove as well as to minimize the spring rate of the system 10. Through empirical testing it has been found that a 350 cubic inch inflated chamber 28 functions well. Further, an expansion reservoir (not shown) which may be desirable under certain conditions, may be incorporated into the system 10 but the provision of same is not known to significantly improve performance of the system 10.

The chamber 28 is inflated in known manner such as via a fitting in the top plate 16 which extends therethrough and ultimately forms an air inlet through the diaphragm element 42 and into the chamber 28 beneath the diaphragm element 42, or via an inlet in the base plate 20 or secondary plate 24. Into and through this inlet 100 is fed approximately 350 cubic inches of pressurized air from the vehicle compressed air system (not shown) to expand the diaphragm element 42.

Although not shown, the unstressed loaded position of the top plate 16 relative to the stop member studs 89 is such that the top plate 16 initially rests approximately half way along the vertical length of the studs 89. This can be accomplished in known manner, such as by providing a leveling valve or pressure regulator for maintaining this initial vertically centered position of the top plate 16.

Also, it will be understood that the positioning of the pillow or chamber 28 in a manner where the fifth wheel 11 is centered thereover provides a decrease in the amount of vertical fifth wheel 12 load transmitted to the semi-tractor via the hinges 22 and decreases the momentum transmitted to the semitractor frame, decreasing vehicle pitch.

Further, although the hinges 22 are relatively compact, because of a great total width of the two hinges 22, lateral or transverse stability is increased and the provision of multiple hinge pivot sections 82 provides large total pivot pin 80 wear surfaces and a large amount of shear area capable of resisting crash load forces thereon.

The system 10 also has a minimized vertical dimension between the horizontal center line of the fifth wheel plate pivot 105 and a horizontal centerline through the pivot pin 80 which has been easily produced by minimizing the height of trunnions 14.

This minimized vertical spacing reduces seat-back slap against the driver because the greater this dimension, the more the trailer fifth wheel 12 load will impart a varying longitudinal force into the semitractor as the fifth wheel 11 moves up and down due to dynamic loading.

Still further, because of the simplicity of design of the system 10, a compact system 10 is produced which has a significantly lower weight as well, allowing for a greater load capacity.

As an alternate embodiment, it is proposed to provide a self contained air bag 110 which conforms to a pocket shape created within the secondary plate 24. Such air bag 110 would simply rest within the confines defined by the secondary plate 24 and would also permit approximately 350 cubic inches in inflated volume.

The provision of the self contained air bag 110 would obviously eliminate the need for the clamp ring 46, and the labor required to secure same to the secondary plate 24.

As defined above the fifth wheel isolation system 10 has a number of advantages some of which are described above and others of which are inherent in the invention.

Further, modifications may be proposed to the system 10 without departing from the teachings herein. Accordingly the scope of the invention should only be limited as necessitated by the accompanying claims.

What is claimed is:

1. An air isolated fifth wheel system comprising:
   a base plate which is slidably received within side channels members mounted to the top side of the frame rails of a vehicle frame, said base plate including means for releasably fixing same to said side channel members at various positions therealong;
   a secondary plate secured to the upper side of said base plate, said secondary plate being radially inwardly downwardly stepped from a periphery thereof, a first step forming a continuous flange and a second step terminating upon an upper surface of said base plate;
   a diaphragm member sized and configured to extend across and seat upon said continuous flange in a manner forming a chamber therebeneath;
   a clamp ring sized and configured to engage over said diaphragm in the area where said diaphragm seats over said continuous flange, said clamping ring securing said diaphragm to said flange in an airtight manner;
   a top plate hingedly fixed to said base plate at one end thereof, a lower surface of said top plate seating across said diaphragm;
   a fifth wheel assembly pivotably mounted on said top plate; and means for providing pressurized air to the chamber formed between said diaphragm and said base plate.

2. The system of claim 1 wherein said flange includes a continuous rib running along a top surface thereof.

3. The system of claim 2 wherein said clamp ring is secured to said flange in areas radially outwardly of said rib.

4. The system of claim 3 wherein said top plate includes a free rotatable end opposite the hinged end.

5. The system of claim 3 wherein said free end includes stop means thereon allowing for approximately 1 inch of vertical free end travel.

6. The system of claim 5 wherein said means for fixing said base plate to said side rails is at a forward end of said system.

7. The system of claim 6 wherein said hinged ends of said top and base plates are at a rear end of said system.

8. The system of claim 7 wherein a rear end of said fifth wheel extends rearwardly outwardly of said hinged ends of said plates.

9. The system of claim 8 wherein said pivotable mounting means of said fifth wheel are centrally located over the extent of said diaphragm.

10. The system of claim 9 wherein said diaphragm is made of fabric reinforced rubber.

11. The system of claim 10 wherein said top and base plates and said clamp ring are made of steel.

12. The system of claim 11 wherein said hinged ends include wide hinge sections, said hinge sections on said top plate being sized and configured to alternate with hinge sections on said lower plate.

13. The system of claim 12 wherein said hinge sections form two broad corner hinges when interconnected.

14. The system of claim 13 wherein the sections of each hinge are joined together by a pivot pin extending therethrough.

15. The system of claim 14 wherein said pivot pin has a large wear surface.

16. The system of claim 15 wherein said chamber is filled to an extent sufficient to place said top plate at an approximately center location relative to the extent of vertical travel of the free end thereof.

17. The system of claim 16 wherein said fifth wheel pivot point is vertically positioned as close as possible to a horizontal center point of said pivot pins interfering with pivotability.

18. The system of claim 17 wherein said chamber is approximately 300 cubic inches in volume.

* * * * *